United States Patent
Osborn et al.

(10) Patent No.: US 9,621,143 B2
(45) Date of Patent: *Apr. 11, 2017

(54) PROPAGATION SIMULATION BUFFER FOR CLOCK DOMAIN CROSSING

(71) Applicant: Advanced Micro Devices, Inc., Sunnyvale, CA (US)

(72) Inventors: Michael J. Osborn, Hollis, NH (US); Michael J. Tresidder, Newmarket (CA); Aaron J. Grenat, Austin, TX (US); Joseph Kidd, Hudson, MA (US); Priyank Parakh, Arlington, MA (US); Steven J. Kommrusch, Fort Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 554 days.

This patent is subject to a terminal disclaimer.

(21) Appl. No.: 14/076,020

(22) Filed: Nov. 8, 2013

(65) Prior Publication Data
US 2014/0062555 A1 Mar. 6, 2014

Related U.S. Application Data

(63) Continuation of application No. 12/938,125, filed on Nov. 2, 2010, now Pat. No. 8,584,067.

(51) Int. Cl.
| | |
|---|---|
| G06F 9/455 | (2006.01) |
| G06F 17/50 | (2006.01) |
| H03K 5/153 | (2006.01) |

(52) U.S. Cl.
CPC ........ *H03K 5/153* (2013.01); *G06F 17/5009* (2013.01); *G06F 17/5031* (2013.01); *G06F 2217/84* (2013.01)

(58) Field of Classification Search
USPC ......................................... 716/108, 113, 136
See application file for complete search history.

(56) References Cited

U.S. PATENT DOCUMENTS

| | | | |
|---|---|---|---|
| 6,370,600 B1 * | 4/2002 | Hughes ................... | G06F 5/10 710/29 |
| 7,082,584 B2 | 7/2006 | Lahner et al. | |
| 7,110,423 B1 * | 9/2006 | Sethuram ............. | H04L 7/0008 370/519 |

(Continued)

*Primary Examiner* — Brian Ngo
(74) *Attorney, Agent, or Firm* — Meyertons, Hood, Kivlin, Kowert & Goetzel, P.C.

(57) ABSTRACT

Techniques are disclosed relating to detecting and minimizing timing problems created by clock domain crossing (CDC) in integrated circuits. In various embodiments, one or more timing parameters are associated with a path that crosses between clock domains in an integrated circuit, where the one or more timing parameters specify a propagation delay for the path. In one embodiment, the timing parameters may be distributed to different design stages using a configuration file. In some embodiments, the one or more parameters may be used in conjunction with an RTL model to simulate propagation of a data signal along the path. In some embodiments, the one or more parameters may be used in conjunction with a netlist to create a physical design for the integrated circuit, where the physical design includes a representation of the path that has the specified propagation delay.

20 Claims, 8 Drawing Sheets

(56) References Cited

U.S. PATENT DOCUMENTS

| | | | |
|---|---|---|---|
| 7,187,741 B2* | 3/2007 | Pontius | H04L 7/005 |
| | | | 375/372 |
| 7,243,322 B1 | 7/2007 | Ly et al. | |
| 7,289,946 B1* | 10/2007 | Lee | G01R 31/31855 |
| | | | 703/16 |
| 7,451,338 B2 | 11/2008 | Lemos | |
| 7,673,201 B1* | 3/2010 | Chan | G06F 1/04 |
| | | | 326/40 |
| 7,779,286 B1 | 8/2010 | Pritchard et al. | |
| 7,853,912 B2 | 12/2010 | Binder et al. | |
| 2003/0002516 A1* | 1/2003 | Boock | H04L 7/02 |
| | | | 370/412 |
| 2003/0081713 A1* | 5/2003 | Pontius | H04L 7/005 |
| | | | 375/372 |
| 2005/0268265 A1 | 12/2005 | Ly et al. | |
| 2006/0282251 A1 | 12/2006 | Schuppe | |
| 2007/0129923 A1 | 6/2007 | Langer et al. | |
| 2007/0130492 A1 | 6/2007 | Jamkhandi | |
| 2008/0313589 A1 | 12/2008 | Maixner et al. | |
| 2009/0119630 A1 | 5/2009 | Binder et al. | |
| 2009/0153194 A1* | 6/2009 | Cumming | H03K 5/15066 |
| | | | 326/93 |
| 2011/0066986 A1* | 3/2011 | Ekanayake | G06F 17/5059 |
| | | | 716/103 |
| 2011/0302460 A1 | 12/2011 | Idgunji et al. | |

* cited by examiner

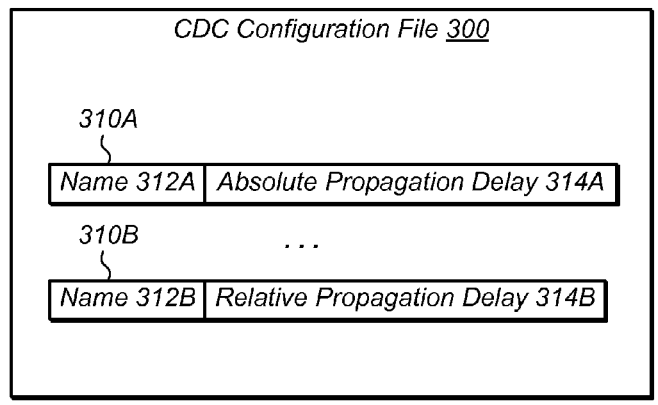
FIG. 3A
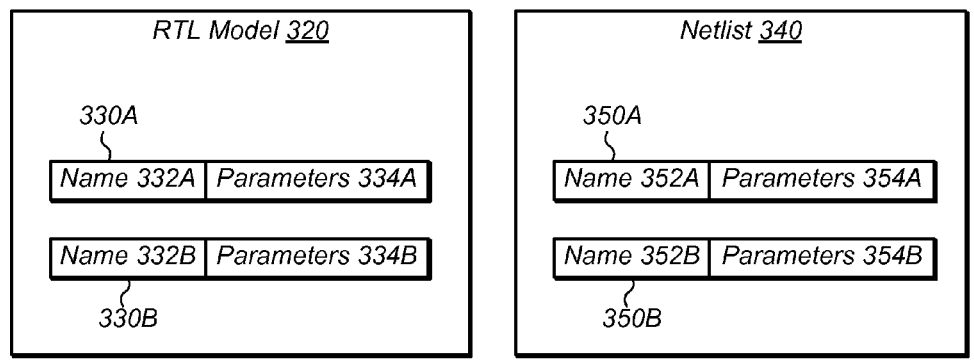
FIG. 3B
FIG. 3C

PROPAGATION SIMULATION BUFFER FOR CLOCK DOMAIN CROSSING

The present application is a continuation of U.S. application Ser. No. 12/938,125 (now U.S. Pat. No. 8,584,067), filed Nov. 2, 2010; the disclosure of which is incorporated by reference herein in its entirety.

BACKGROUND

Technical Field

This disclosure relates generally to integrated circuits, and, more specifically, to clock domain crossing within integrated circuits.

Description of the Related Art

Different elements (e.g., flip flops or "flops") in an integrated circuit ("IC," e.g., a processor) may be driven by clock signals that operate at different frequencies and/or different phases. A "clock domain crossing" occurs when a signal is transmitted from a source driven by a first clock signal to a destination driven by a second clock signal. Various problems can arise depending on the relationship of the two clock signals. For example, if the clock signals are out of phase, the destination may sample a signal before it has stabilized, creating a "metastability" problem. Furthermore, if the second clock signal has a lower clock frequency than the first clock signal, the destination may not receive all data being provided by the source. In many instances, problems of this nature are not detected until after a sample of the integrated circuit is fabricated, thus raising design costs and decreasing the speed of implementation.

SUMMARY OF EMBODIMENTS

The present disclosure describes various embodiments of methods and structures to detect and minimize timing problems created by clock domain crossing (CDC).

In one embodiment, a method is disclosed that includes adding signal path information to a configuration file. The signal path information identifies a path in an integrated circuit that has a source in a first clock domain and a destination in a second clock domain. The method further includes adding one or more timing parameters for the path to the configuration file, where the one or more timing parameters specify a propagation delay from the source to the destination. The configuration file is usable by a simulation tool to simulate operation of the integrated circuit. In some embodiments, the method further includes inserting a marker into a register-transfer-level (RTL) model of the integrated circuit, where the marker associates the signal path information and the one or more timing parameters with information in the RTL model about the path. The method further includes providing the RTL model and the configuration file to the simulation tool. The simulation tool is executable to use the RTL model and specified propagation delay to perform a logical simulation of the path.

In one embodiment, a method is disclosed that includes receiving a register-transfer-level (RTL) model for an integrated circuit. The RTL model includes a marker associating a path in the integrated circuit with one or more timing parameters that specify a propagation delay for the path from a source in a first clock domain to a destination in a second clock domain. The method further includes simulating propagation of a data signal along the path based on the RTL model and the specified propagation delay. In some embodiments, the marker represents a buffer that is inserted into the path, where the buffer is configured to delay propagating the data signal from the source to the destination for the specified propagation delay.

In one embodiment, a method is disclosed that includes receiving a netlist for an integrated circuit. The netlist includes a marker associating a path in the integrated circuit with one or more timing parameters. The one or more timing parameters specify a propagation delay for the path from a source in a first clock domain to a destination in a second clock domain. The method further includes creating a physical design for the integrated circuit based on the received netlist and the one or more timing parameters, where the physical design includes a representation of the path that has the specified propagation delay.

In one embodiment, a computer readable storage medium is disclosed that has a configuration file stored thereon. The configuration file includes signal path information identifying a path in an integrated circuit that has a source in a first clock domain and a destination in a second clock domain. The configuration file further includes one or more timing parameters for the path that specify a propagation delay from the source to the destination. The configuration file is usable by a simulation tool to simulate operation of the integrated circuit. In some embodiments, the computer readable storage medium also has an RTL model stored thereon. The RTL model includes a marker representing a buffer that is inserted into the path, where the buffer is configured to delay propagating the data signal from the source to the destination for the specified propagation delay. In some embodiments, the computer readable storage medium also has a netlist stored thereon. The netlist includes a marker representing a buffer that is inserted into the path, where the buffer is configured to delay propagating the data signal from the source to the destination for the specified propagation delay.

In one embodiment, a method is disclosed that includes determining signal path information for addition to a configuration file. The signal path information identifies a path in an integrated circuit that has a source in a first clock domain and a destination in a second clock domain. The method further includes determining one or more timing parameters for the path for addition to the configuration file. The one or more timing parameters specify a propagation delay from the source to the destination. The configuration file is usable by a simulation tool to simulate operation of the integrated circuit.

In one embodiment, a method is disclosed that includes receiving a configuration file associated with an integrated circuit. The configuration file includes signal path information identifying a path in an integrated circuit that has a source in a first clock domain and a destination in a second clock domain. The configuration file includes one or more timing parameters specifying a propagation delay from the source to the destination. The method further includes simulating, via a simulation tool, operation of the integrated circuit based on the configuration file.

BRIEF DESCRIPTION OF THE DRAWINGS

FIG. 3A is a block diagram illustrating one embodiment of a CDC configuration file that includes one or more timing parameters.

FIG. 3B is a block diagram illustrating one embodiment of an RTL model that includes one or more markers.

FIG. 3C is a block diagram illustrating one embodiment of a netlist that includes one or more markers.

DETAILED DESCRIPTION

Figure 1:
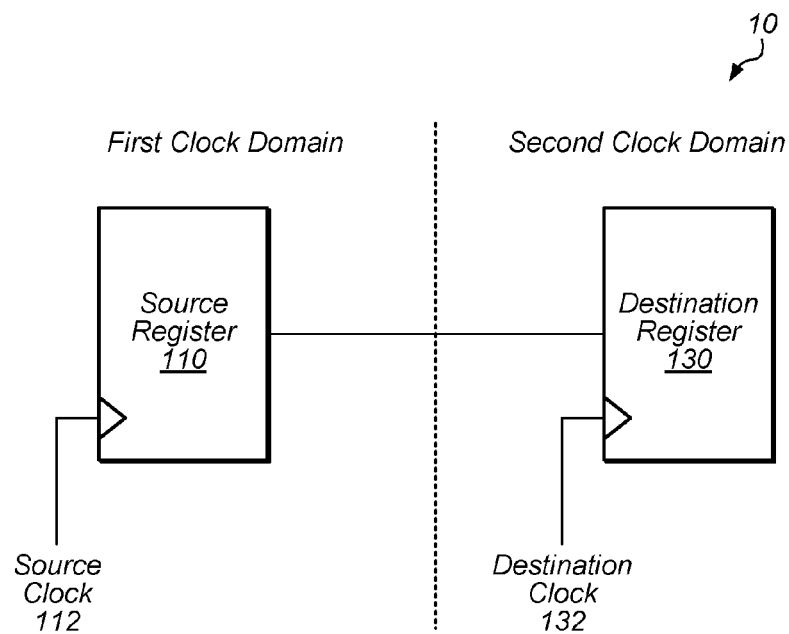
FIG. 1 is a block diagram illustrating one embodiment of an integrated circuit in which clock domain crossing occurs.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Processor." This term has its ordinary and accepted meaning in the art, and includes a device that is capable of executing instructions. A processor may refer, without limitation, to a central processing unit (CPU), a co-processor, an arithmetic processing unit, a graphics processing unit, a digital signal processor (DSP), etc. A processor may be a superscalar processor with a single or multiple pipelines. A processor may include a single or multiple cores that are each configured to execute instructions.

"Clock Domain." This term has its ordinary and accepted meaning in the art, and includes circuitry within a processor in which logic is driven using the same clock signal (i.e., a signal that has the same frequency and phase). In contrast, logic units may be described as being in different clock domains if they are driven by clock signals that have different frequencies and/or phases.

"Register." As used herein, this term describes any silicon storage element such as a flip-flop, a static ram bit cell, a latch, and similar constructs.

"Configuration file." As used herein, this term refers to any type of file that stores 1) information identifying a path in a processor that has a source in a first clock domain and a destination in a second clock domain and 2) one or more timing parameters for the path. A configuration file may store additional information such as RTL model information, netlist information, etc. In some embodiments, a configuration file may be generated from an RTL model, such as described below.

"Register Transfer Level (RTL)." This term has its ordinary and accepted meaning in the art, and includes a level of abstraction that is used to describe a circuit in terms of signals and logical operations performed on those signals. RTL can be used to construct models (referred to herein as RTL models) that may be used to simulate operations of integrated circuits. RTL models can be created using hardware description languages such as Verilog, VHDL, etc.

"Netlist." This term has its ordinary and accepted meaning in the art, and includes a list of structures present in an integrated circuit and a description of how those structures are connected to one another. For example, a netlist may include a set of gates (e.g., defined in a synthesis library), which represent the functionality of an integrated circuit. Netlists can be created from RTL models, and used to produce physical designs of integrated circuits. Netlists may be created using hardware description languages such as Verilog, VHDL, etc.

"Error Signal." As used herein, this term refers to a signal that, if sampled, may indicate the presence of a timing problem. In one embodiment, an error signal may correspond to a signal referred to in Verilog as an unknown signal or an X signal. As will be described below, in some embodiments, logical analysis tools may be able to detect timing problems created by clock domain crossing (CDC), by detecting whether a destination has attempted to sample an error signal.

* * *

The present disclosure describes various techniques for detecting and minimizing timing problems created by clock domain crossing (CDC). Such techniques may reduce design costs, decrease design and implementation times, and produce integrated circuits that are more robust. In order to appreciate the various techniques described herein, an example of an integrated circuit in which clock domain crossing occurs is described first in conjunction with FIG. 1.

Turning now to FIG. 1, a block diagram of one embodiment of an integrated circuit (IC) 10 is shown. IC 10 may be any suitable type of integrated circuit that includes multiple clock domains. In some embodiments, IC 10 may be a processor, field-programmable gate array (FPGA), application-specific integrated circuit (ASIC), etc. In the illustrated embodiment, IC 10 includes a source register 110 that is coupled to a destination register 130 via a path 120. Source register 110 is driven by source clock 112 and located in a first clock domain. Destination register 130 is driven by destination clock 132 and located in a second clock domain. In one embodiment, source register 110 is configured to drive a data signal on path 120 in response to a rising edge of source clock 112. In one embodiment, destination register 130 is configured to then sample the signal in response to a rising edge of destination clock 132. IC 10 may be configured differently in other embodiments.

Clock domain crossing occurs in IC 10 if clocks 112 and 132 are configured to operate at different frequencies and/or different phases. In order for data to be successfully transmitted between registers 110 and 130, register 130 is configured to sample each data signal driven by register 110 after that data signal has stabilized. If the timing of clocks 112 and 132 are not properly coordinated, register 130 may fail to sample each signal or sample signals before they have settled. As noted above, sampling signals incorrectly can result in metastability and/or data loss.

A problem with modern behavioral simulation tools is that they may not have the ability to determine whether clocks 112 and 132 are properly coordinated. Modern behavioral simulation tools typically operate in zero-time. That is, while these tools may have the ability to analyze inputs and outputs of logic in an integrated circuit, they are not able to factor in timing constraints, such as those created by physical properties of an integrated circuit such as IC 10. Thus, behavioral simulation tools may be unable to determine whether clocks 112 and 132 are properly coordinated because the timing of clocks 112 and 132 is dependent upon the propagation delay of path 120, which, in turn, is dependent upon physical properties of IC 10. As a result, developers, in many instances, instruct behavioral simulation tools to avoid analyzing paths that cross between clock domains, and this risks human error, which can cause developers to detect timing problems once a sample of an integrated circuit is fabricated. If timing problems are ultimately detected, the integrated circuit may need to be redesigned, further delaying implementation.

If a path is suspected to have potential potentially have timing problems, a multistage synchronizer may be inserted into the path to coordinate operation of registers. Typically, multistage synchronizers use metastable hardened flops offering single or double latency delays to ensure that no metastability exists. Multistage synchronizers, however, occupy space and consume power. They also can increase the propagation delay of a path, causing operations that use the path to take longer. Thus, in many instances, it is better to ensure that the timing of clocks is properly coordinated rather than use a multistage synchronizer to correct timing problems.

Accordingly, various techniques are described herein to detect and minimize timing problems—particularly prior to circuit fabrication. In various embodiments, one or more timing parameters are associated with a path that crosses between clock domains (referred to herein as a "CDC path"—e.g., path 120). As will be described below, the timing parameters may then be used during different design stages to test for timing problems in an integrated circuit, drive design of elements in the integrated circuit, etc. For example, in some instances, it may be possible to estimate a propagation delay for a CDC path based on logic that will be present in that path. In one embodiment, parameters specifying the estimated propagation delay may be used by logical analysis tools during a simulation stage to facilitate testing for timing problems. As another example, in some instances, a given CDC path may need to have a particular propagation delay in order for logic in the integrated circuit to function properly. In one embodiment, parameters specifying the particular propagation delay may be provided to design tools, during a design stage, to facilitate designing a path with the specified propagation delay.

As will be described below, in one embodiment, timing parameters for one or more CDC paths may be distributed to different design stages using a configuration file, which may be parsed by different design tools and/or viewed by developers. In one embodiment, the configuration file includes signal path information that identifies a CDC path. In some embodiments, such information may include a name, identifier, or location of that path. In one embodiment, the configuration file also includes one or more timing parameters that specify a propagation delay for the path. In some embodiments, the one or more timing parameters may specify an absolute propagation delay—i.e., a fixed amount of time (e.g., 10 ns) for a signal to cross the path. In some embodiments, the one or more timing parameters may specify a relative propagation delay—i.e., an amount of time expressed as a function of clock cycles (e.g., three clock cycles) for a signal to cross the path. In one embodiment, the one or more timing parameters may specify both absolute and relative propagation delays. In various embodiments, the configuration file may include additional information that is relevant to specific design stages, such as RTL model information (e.g., RTL code written in Verilog for an RTL model), netlist information, etc. In some embodiments, the configuration file may also be generated from information that is relevant to specific design stages. For example, in one embodiment, the configuration file may be generated by parsing an RTL code for timing parameters. Various embodiments of the configuration file are described in further detail below in conjunction with FIG. 3.

Different design stages that may use the configuration file are described next in conjunction with FIG. 2.

Figure 2:
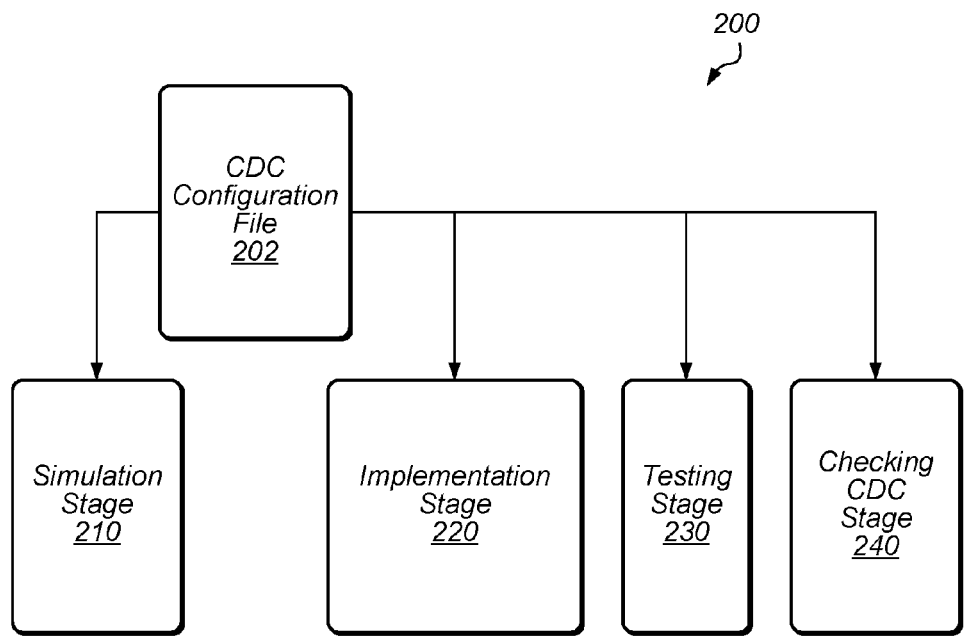
FIG. 2 is a block diagram illustrating stages in an exemplary design process for an integrated circuit.

Turning now to FIG. 2, a block diagram of an exemplary design process 200 for an integrated circuit is depicted. Design process 200 is one embodiment of a design process that uses a CDC configuration file 202 during one or more different design stages. In the illustrated embodiment, design process 200 includes simulation stage 210, implementation stage 220, timing stage 230, and CDC checking stage 240. In some embodiments, design process 200 may include more or less stages than shown. Stages 210-240 may be performed in any suitable order. Stages 210-240 may also be performed concurrently.

In the illustrated embodiment, CDC configuration file 202 is provided to each stage 210-240. In some embodiments, file 202 may be provided to more or less stages than shown. In one embodiment, the same version of file 202 may be provided to each stage 210-240. In another embodiment, different versions of file 202 may be provided to different stages 210-240. For example, the version of file 202 that is used in simulation stage 210 may include only information that is relevant for that stage (e.g., RTL model information). File 202 may also be formatted differently depending upon the tools being used in a particular stage. In short, file 202 may be provided to any suitable stages in any suitable form.

Simulation stage 210, in one embodiment, is a stage in which a logical analysis is performed on structures within an integrated circuit to determine whether those structures are operating as intended. In stage 210, logical analysis tools (i.e., simulation tools, synthesis tools, etc.) may be used to simulate operation of structures by applying a series of logical operations on a set of inputs and analyzing the resultant outputs. In one embodiment, logical analysis tools simulate operation of an integrated circuit using a register-transfer-level (RTL) model. In an RTL model, structures of the circuit can be represented by inserting markers. For example, a reset-set (RS) flip-flop might be represented in a model as a pair of markers corresponding to NOR gates.

In various embodiments, logical analysis tools can perform a logical analysis of structures associated with CDC paths by using an RTL model and one or more timing parameters stored in file 202. To perform a logical analysis of a structure that includes a CDC path, a marker, in one embodiment, is inserted into an RTL model to simulate a propagation delay specified by one or more parameters in file 202. In one embodiment, the marker represents a buffer (referred to herein as a CDC buffer) that is present in the CDC path and is configured to receive a data signal from a source (e.g., source register 110) and to provide the data signal to a destination (e.g., source register 130) after the specified propagation delay. In one embodiment, while the buffer is delaying propagation of the data signal, the buffer is configured to provide an error signal to the destination. If the destination attempts to sample the error signal before the propagation delay has transpired, logical analysis tools may determine that potential timing problems exist. By delaying conveyance of the data signal and initially providing an error signal, the CDC buffer is able to create the effect of a propagation delay for a CDC path during simulation. In some instances, a developer may use a CDC buffer to test a desired propagation delay for a particular CDC path (e.g., 10 ns). If testing does not reveal timing problems, the propagation delay may then be used to design the CDC path to have that delay. CDC buffers are described in further detail below in conjunction with FIGS. 4A-7B.

In some embodiments, configuration file 202 may be generated from RTL code during stage 210. In one embodiment, configuration file 202 may be generated by parsing the RTL code for one or more timing parameters specified by the code. In some embodiments, configuration file 202 may also be generated by inferring timing parameters based on the names of markers present in RTL code. For example, a marker having the name "CDC100" may have an inherent delay of 100 ps without the RTL code explicitly stating a delay of 100 ps. Thus, the configuration file may include one or more timing parameters that are determined by parsing the RTL code for the name CDC100. (As discussed above, in some embodiments, configuration file 202 may also include RTL code that specifies timing parameters (inherently or explicitly), which may be used during other stages during design process 200.)

Implementation stage 220, in one embodiment, is a stage in which a physical design of an integrated circuit is produced from a netlist of the circuit. In stage 220, developers may use various design tools to create physical representations of structures based on their logical representations described in the netlist. A physical design, including these physical representations, may then be used to generate photomasks for fabrication of the integrated circuit.

In various embodiments, a physical design that includes CDC paths can be created based on a netlist and propagation delays specified by parameters in file 202. To create a representation of a particular CDC path, a marker, in one embodiment, is inserted into the netlist to associate a propagation delay with that path. Based on this association, design tools can then create a physical representation of the path that has the propagation delay. In various embodiments, the marker represents the CDC buffer described above. In some embodiments, the CDC buffer may be removed from (e.g., optimized out of) the created physical design, and thus the fabricated circuit. In other embodiments, the CDC buffer (in whole or in part) may be present in the physical design.

Timing stage 230, in one embodiment, is a stage in which timing characteristics of an integrated circuit are tested before fabrication. In stage 230, various timing tools may analyze a physical design, created in stage 220, to determine whether various structures function as designed. For example, a structure in a pipeline stage of a processor may be tested to ensure that it can produce an output within the time allotted for that pipeline stage. In various embodiments, timing tools used in stage 230 may test structures that have one or more CDC paths using propagation delays specified by parameters in file 202. To test a particular CDC path, a timing tool, in one embodiment, may parse file 202 for the propagation delay associated the path, and then determine whether the representation of the path in the physical design has the specified propagation delay.

CDC checking stage 240, in one embodiment, is a stage in which CDC tools check for paths that may be CDC paths. If a path is determined to be a CDC path, CDC tools may provide an indication to developers to facilitate further testing of the path to determine whether a redesign is necessary. In various embodiments, CDC tools may parse file 202 to determine whether paths have already been identified as CDC paths. If a path has already been identified as a CDC path in file 202, CDC tools may exclude that path from being tested and subsequently being identified as a CDC path. Thus, developers are not informed of CDC paths for which they are already aware.

As discussed above, in many instances, prior design techniques did not allow developers to test for timing problems created by CDC until after a sample of the integrated circuit is fabricated. By being able to test for timing problems prior to fabrication and to drive implementation based on tested results, developers can more quickly implement robust integrated circuits.

Turning now to FIG. 3A, a block diagram of CDC configuration file 300 is depicted. CDC configuration file 300 is one embodiment of a file that stores signal path information and one or more timing parameters, which can be used during different stages in a design process. In the illustrated embodiment, file 300 includes entries 310A and 310B corresponding to two CDC paths. Entry 310A includes a name 312A and an absolute propagation delay 314A. Entry 310B includes a name 312B and a relative propagation delay 314B. File 300 may include more or less entries 310 than shown.

Names 312, in one embodiment, are representative of signal path information that identifies CDC paths and associates those paths with respective propagations delays 314. In one embodiment, a name 312 may be a name of a CDC path. In some embodiments, a name 312 may specify a location of a path in an integrated circuit. For example, in one embodiment, a name 312 may specify the name of a cell that includes the path. In one embodiment, a name 312 may be a name of a marker that is present in RTL model, netlist, etc. In some embodiments, a name 312 may specify the type of buffer that a marker represents (different types of CDC buffers are described in conjunction with FIGS. 4A-7B).

Absolute propagation delay 314A and relative propagation delay 314B, in one embodiment, are two different forms of propagations delays that may be associated with a particular CDC path. As discussed above, in one embodiment, absolute propagation delay 314A is a fixed amount of time (e.g., 10 ns) for a signal to cross a path. In one embodiment, relative propagation delay 314B is a delay expressed as a function of clock cycles (e.g., three clock cycles) for a signal to cross a path. In some embodiments, an entry 310 for a particular path may include parameters specifying both absolute and relative propagation delays. In one embodiment, if a CDC path is associated with both forms of delays (e.g., 10 ns and 3 clock cycles), various tools may use the greater of the two as the propagation delay for the path. For example, if three clock cycles occur in less than 10 ns, then 10 ns may be used as the propagation delay for the path. On the other hand, if 10 ns is less than three clock cycles, then three clock cycles may be used. Propagation delays 314 may be selected based on any suitable criteria. In some embodiments, a delay 314 may be selected based on known physical properties of an integrated circuit, such as material composition, a known capacitance of a path, a known length of a path, etc. In some embodiments, a delay 314 may be selected based on properties of logic present in a path or properties of logic that includes a path. In some embodiments, a delay 314 may be selected as design goal for a particular path. In some embodiments, CDC configuration file 300 may not explicitly state a delay 314 for each entry 310, but rather a delay may be inferred from the name 312 in that entry 310.

As discussed above, in some embodiments, CDC configuration file 300 may include additional information that is relevant to specific design stages or even specific tools. In one embodiment, file 300 may include RTL model information (e.g., corresponding to RTL model 320 described below in conjunction with FIG. 3B). In one embodiment, file 300 may include netlist information (e.g., corresponding to netlist 340 described below in conjunction with FIG. 3C). In short, file 300 may include any suitable information that may be used in design process 200.

Turning now to FIG. 3B, a block diagram of an RTL model 320 is depicted. RTL model 320 is one embodiment of an RTL model that may be used during simulation stage 210 to test for timing problems caused by CDC. In various embodiments, RTL model 320 may include descriptions of structures present in an integrated circuit, where a description of a given structure may describe its inputs/outputs and the logical operations that it performs. In the illustrated embodiment, RTL model 320 also includes markers 330A and 330B associated with CDC paths. (As discussed above, in one embodiment, a marker represents a buffer that is inserted into the path to facilitate simulation of a propagation delay of the path.) Markers 330A and 330B include names 332A and 332B and one or more parameters 334A and 334B, respectively. RTL model 320 may include more or less markers 330 than shown.

Names 332, in one embodiment, are identifiers that refer to specific instances of CDC buffers. In some embodiments, a name 332 for a given buffer may specify information about its location, its type, etc. In one embodiment, logical analysis tools may use a name 332 to identify a corresponding entry 310 in file 300. For example, in some embodiments, name 312A and name 332A may be equivalent.

Parameters 334, in one embodiment, specify properties of CDC buffers. Parameters 334 may identify inputs and/or outputs and how they are connected to other structures in the RTL model. For example, in one embodiment, one or more parameters 334 may identify an input signal received by a particular CDC buffer and identify the source of that signal. Parameters 334 may also specify logical operations performed by CDC buffers. For example, in some embodiments described below in conjunction with FIGS. 6A and 7A, a CDC buffer may be implemented using a NAND gate—thus, in one embodiment, a parameter 334 might indicate that a NAND operation is to be performed by a particular buffer.

As one example, RTL model 320, in one embodiment, may include the following Verilog code:

```
CDCBUFENCLK i0 [1:0] (
    .A({Valid, New}), // Signals from source flops
        // synopsys translate_off
    DSTCLK(clk),
        // synopsys translate_on
    .EN(Safe),
    .Z({SafeValid,SafeNew}) );
always @(posedge clk)
if (SafeValid)
    Data <= SafeNew
else
    Data <= Data
```

This code may correspond to a marker 330 for one embodiment of a CDC buffer described below in conjunction with FIGS. 7A and 7B.

In some embodiments, RTL model 320 may also include information that is usable to generate configuration file 300. For example, RTL model 320 may explicitly state timing parameters. The following is one example of such information:

```
CDCBUFENCLK i0 #(.DELAY(10)) (
    .A(Valid), // Signals from source flops
        // synopsys translate_off
    .DSTCLK(clk),
        // synopsys translate_on
    .EN(Safe),
    .Z(SafeValid) );
```

In this example, a CDC buffer called CDCBUFENCLK has a delay parameter specified by .DELAY(10). Running a simulation using this code may produce a configuration file 300 if the model for CDCBUFENCLK prints out the delay parameter. This file may then be used for gate-timing checks. As discussed above, in one embodiment, timing parameters may also be inferred from names present in RTL model 320. For example, RTL 320 may include multiple CDC buffer cells with different inherent delays (e.g., CDC100 for a 100 ps delay, CDC200 for a 200 ps delay, etc.).

Turning now to FIG. 3C, a block diagram of a netlist 340 is depicted. Netlist 340 is one embodiment of a netlist that may be used during implementation stage 220 to create a physical design of an integrated circuit. In various embodiments, netlist 340 may include a list of structures present in an integrated circuit and a description of how those structures are connected. In the illustrated embodiment, netlist 340 also includes markers 350A and 350B associated with two CDC paths. Markers 350A and 350B include names 352A and 352B and parameters 354A and 354B, respectively. Netlist 340 may include more or less markers 330 than shown.

Names 352, in one embodiment, are identifiers that refer to specific instances of CDC buffers. In some embodiments, a name 352 for a given buffer may specify information about its location, its type, etc. In one embodiment, design tools and/or developers may use a name 332 to identify a corresponding entry 310 in file 300.

Parameters 354, in one embodiment, specify properties of CDC buffers. Parameters 354 may identify inputs and outputs of a given buffer and identify their sources and destinations, respectively. For example, one or more parameters 354 may indicate that a particular buffer outputs a data signal, and identify the destination of that signal.

Various embodiments of CDC buffers will now be described in conjunction with FIGS. 4A-7B.

Figure 4A:
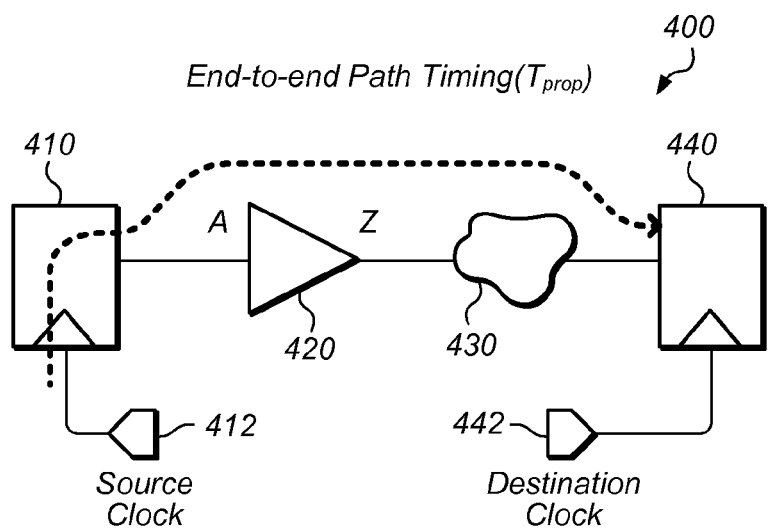
FIG. 4A is a block diagram illustrating one embodiment of a CDC buffer that creates an absolute propagation delay.

Turning now to FIG. 4A, a block diagram 400 is depicted that includes CDC buffer 420. CDC buffer 420 is one embodiment of a buffer that is configured to simulate an absolute propagation delay (shown as $T_{prop}$) for a CDC path. (As noted above, an absolute propagation delay is a fixed amount of time for a signal to cross a path.) In some embodiments, buffer 420 may be represented in an RTL model and/or netlist by inserting a marker (e.g., marker 330 or marker 350, respectively). In some embodiments, buffer 420 may be optimized out of the physical design of an integrated circuit. In one embodiment, $T_{prop}$ may be specified by one or more parameters in configuration file 300.

In diagram 400, a source register 410 is coupled to a destination register 440 via a CDC path that includes buffer 420 and logic 430. Registers 410 and 440 are driven by source clock 412 and destination clock 442, respectively. In one embodiment, when register 410 drives an input signal A on the path, buffer 420 is configured to provide that signal (as output signal Z) to logic 430 after a propagation delay of $T_{prop}$. In one embodiment, while buffer 420 is delaying propagation of the change, buffer 420 is configured to drive an error signal through logic 430 for the period of $T_{prop}$. In some embodiments, this error signal is a signal that indicates that the output is currently unknown, such as the X signal used in Verilog. If register 440 attempts to sample output signal Z before $T_{prop}$ has transpired, register 440 may sample the error signal provided by buffer 420. On the other hand, if register 440 samples output signal Z after $T_{prop}$ has transpired, register 440, in one embodiment, will sample the correct data signal propagated from input signal A.

By delaying propagation of the data signal and initially providing an error signal, buffer 420 is able to create the effect of a propagation delay during simulation. Logical analysis tools can analyze the signals being sampled by register 440 to then determine whether timing problems exist.

Figure 4B:
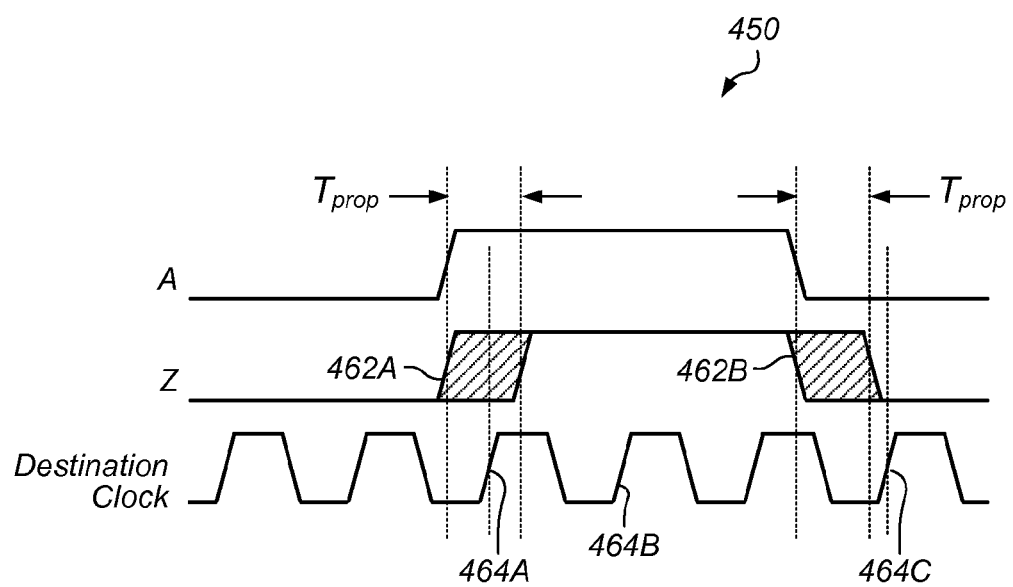
FIG. 4B is an exemplary timing diagram for the CDC buffer shown in FIG. 4A.

Turning now to FIG. 4B, an exemplary timing diagram 450 for one embodiment of CDC buffer 420 is depicted. In timing diagram 450, buffer 420 receives an input signal A that initially changes from low to high and subsequently changes back from high to low. When the initial change occurs, buffer 420 causes output signal Z to change from low to an error signal, as indicated by region 462A. After a propagation delay of $T_{prop}$, buffer 420 then reflects the change of input signal A by raising output signal Z. When input signal A subsequently changes, buffer 420 again causes output signal Z to be an error signal for a period of $T_{prop}$, (as indicated by region 462B), and afterwards, lowers output signal Z.

As discussed above, register 440 may have sampling problems depending on the timing of the sampling. In timing diagram 450, if register 440 attempts to sample signal Z on rising clock edge 464A, register 440 will not sample the data signal, and instead, samples the error signal shown in region 462A. If, however, register 440 attempts to sample signal Z on rising clock edges 464B or 464C, register 440 will correctly sample the data signal. By adjust $T_{prop}$, the source clock, and/or the destination clock, developers can minimize the chance that register 440 will incorrectly sample signal Z.

Figure 5A:
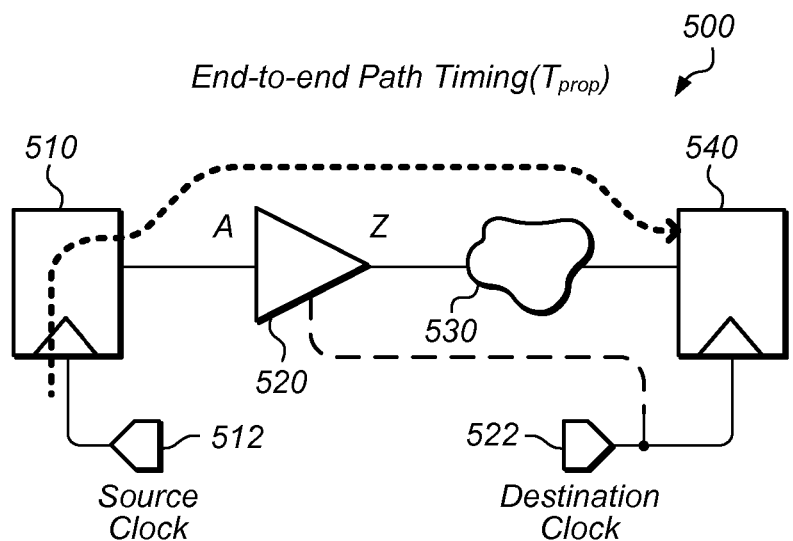
FIG. 5A is a block diagram illustrating one embodiment of a CDC buffer that creates a relative propagation delay.

Turning now to FIG. 5A, a block diagram 500 is depicted that includes CDC buffer 520. CDC buffer 520 is one embodiment of a buffer that is configured to simulate a relative propagation delay (shown as $T_{prop}$) for a CDC path. (As note above, a relative propagation delay is an amount of time expressed as a function of clock cycles—e.g., three rising clock edges, three clock cycles, etc.) Like buffer 420, buffer 520, in some embodiments, may be represented in an RTL model and/or netlist by inserting a marker (e.g., marker 330 or marker 350, respectively). In some embodiments, buffer 520 may be optimized out of the physical design of an integrated circuit. In one embodiment, $T_{prop}$ may be specified by one or more parameters in configuration file 300.

In diagram 500, a source register 510 is coupled to a destination register 540 via a CDC path that includes buffer 520 and logic 530. Registers 510 and 540 are driven by source clock 512 and destination clock 542, respectively. In the illustrated embodiment, buffer 520 is configured to receive a clock signal from destination clock 542, and to use the clock signal to determine when $T_{prop}$ has transpired. Like buffer 420, in one embodiment, when register 510 drives an input signal A on the path, buffer 520 is configured to drive an error signal through logic 530 for a period of $T_{prop}$, and to then provide the data signal (as output signal Z) to logic 530 after $T_{prop}$. In one embodiment, buffer 520 is configured to determine when $T_{prop}$ has transpired by counting the number of rising clock edges of destination clock 542 that have occurred since the value of input signal A was changed. For example, in one embodiment, if $T_{prop}$ is specified as three rising clock edges, buffer 520 may be configured to propagate a change of input signal A to output signal Z after buffer 520 detects three rising clock edges since the change in signal A.

By initially providing an error signal and then providing the data signal, buffer 520 is able to create the effect of a relative propagation delay during simulation. Logical analysis tools can analyze the signals being sampled by register 540 to then determine whether timing problems exist.

In some embodiments, buffer 520 may be configured to create the effect of both absolute and relative propagation delays. In one embodiment, buffer 520 is configured to select the greater delay in determining when to provide an error signal and the data signal. For example, in one embodiment, if $T_{prop}$ is expressed as 10 ns or three rising clock edges, and three rising clock edges occurs after 10 ns, buffer 520 may provide an error signal until it detects three rising clock edges. At which point, buffer 520 may then provide the data signal. Timing diagram 550 described next illustrates such usage of both delay types.

Figure 5B:
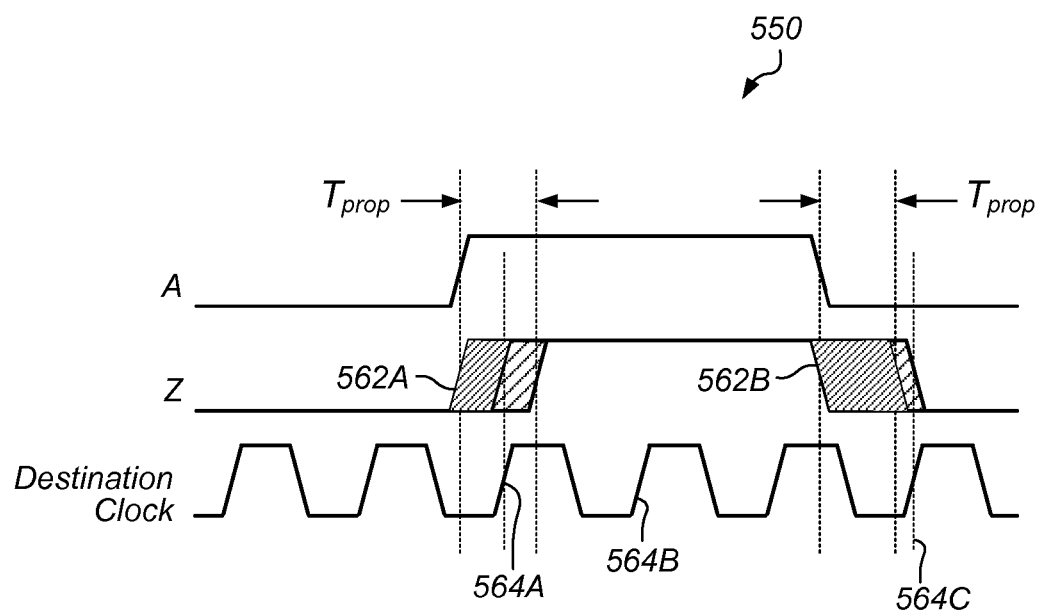
FIG. 5B is an exemplary timing diagram for the CDC buffer shown in FIG. 5A.

Turning now to FIG. 5B, an exemplary timing diagram 550 for one embodiment of CDC buffer 520 is depicted. In illustrated embodiment, buffer 520 is configured to provide an error signal for an absolute delay (labeled as $T_{prop}$) or a relative delay of one rising edge, whichever is greater. In timing diagram 550, buffer 520 receives an input signal A that initially changes from low to high and subsequently changes back from high to low. When the initial change occurs, buffer 520 provides an error signal (shown as region 562A) for a period of $T_{prop}$, since it occurs later than one rising edge of the destination clock. Afterwards, buffer 520 then causes output signal Z to reflect the initial change in signal A. If register 540 attempts to sample signal Z on rising clock edge 564A, register 540 will incorrectly sample the data signal, and instead, sample the error signal. On the other hand, if register 540 attempts to sample signal Z on rising clock edges 564B, register 540 will correctly sample the data signal. When input signal A subsequently changes again, buffer 520, this time, causes output signal Z to be an error signal (shown as region 562B) until the first rising edge of the destination clock (because the rising edge occurred after $T_{prop}$). Afterwards, buffer 520 lowers output signal Z to reflect the change in signal A.

Figure 6A:
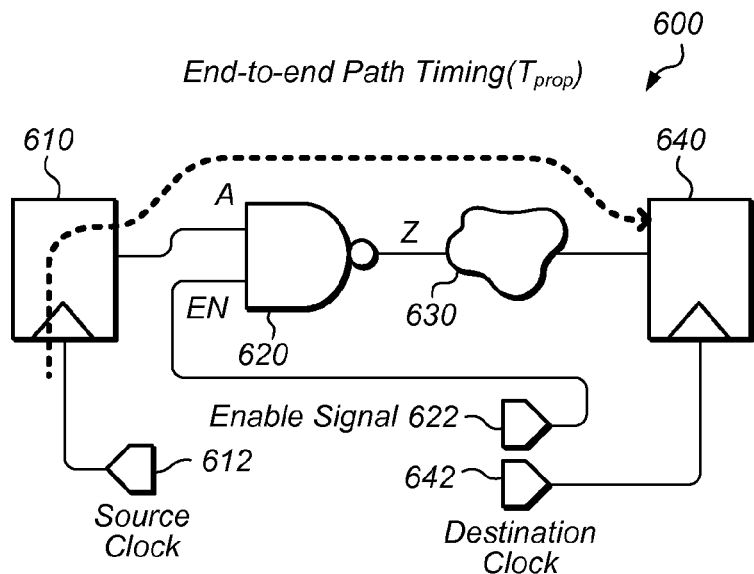
FIG. 6A is a block diagram illustrating one embodiment of a CDC buffer that creates an absolute propagation delay and receives an enable signal.

Turning now to FIG. 6A, a block diagram 600 is depicted that includes CDC buffer 620. CDC buffer 620 is another embodiment of a CDC buffer that is configured to create an absolute propagation delay (shown as $T_{prop}$) for a CDC path. In one embodiment, CDC buffer 620 is further configured to receive an enable signal, and to provide an error signal and then propagate a data signal over the path in response to the enable signal being asserted. In some embodiments, the enable signal is asserted after an input signal is initially received so that buffer 620 does not provide an error signal for the entire period of the propagation delay. Like other buffers described above, buffer 620, in some embodiments, may be represented in an RTL model and/or netlist by inserting a marker (e.g., marker 330 or marker 350, respectively). In some embodiments, buffer 620 (in whole or in part) may be present in the physical design of an integrated circuit, and thus, present in the fabricated circuit. In one embodiment, $T_{prop}$ may be specified by one or more parameters in configuration file 300. As will be described below, in some instances, buffer 620 may minimize the chances that timing problems are introduced when an RTL model that includes a marker for buffer 620 is synthesized to produce a netlist.

In diagram 600, a source register 610 is coupled to a destination register 640 via a CDC path that includes buffer 620 and logic 630. Registers 610 and 640 are driven by source clock 612 and destination clock 642, respectively. In the illustrated embodiment, buffer 620 is implemented as a NAND gate that is configured to logically gate input signal A with an enable signal 622. (In other embodiments, buffer 620 may be implemented differently—e.g., as a AND gate, or some other combination of logic.) In one embodiment, if enable signal 622 is not asserted (e.g., signal 622 is a logical zero), buffer 620 is configured to output a constant signal (e.g., a logical one) regardless of the value of input signal A. Once enable signal 622 is asserted (e.g., signal 622 becomes a logical one), buffer 620, in one embodiment, is configured to determine whether $T_{prop}$ has transpired. In one embodiment, if $T_{prop}$ has not transpired, buffer 620 is configured to then provide an error signal (as output signal Z) for the remaining period of $T_{prop}$. At which point, buffer 620 is configured to propagate the change in input signal A to output signal Z. On the other hand, if $T_{prop}$ has transpired, buffer 620 is configured to propagate the change in input signal A to output signal Z without initially providing an error signal. In some embodiments, enable signal 622 is asserted after input signal A changes and a predetermined number of one or more rising edges of destination clock 642 have occurred.

In some instances, simulating an RTL model using CDC buffers 420 and 520 (e.g., during stage 210) may indicate that no dynamic glitches (i.e., timing problems) exist, but when the RTL model is synthesized to produce a netlist, dynamic glitches may be subsequently introduced. Dynamic glitches, however, may be less likely to be introduced if the RTL model includes a marker for buffer 620 (or buffer 720 described below) since buffer 620 may be implemented in a netlist, in some embodiments, as a NAND gate (or AND gate) that is configured to logically gate input signal A with an enable signal 622. As a result, buffer 620 and 720 may be more effective in detecting dynamic glitches in some instances.

Figure 6B:
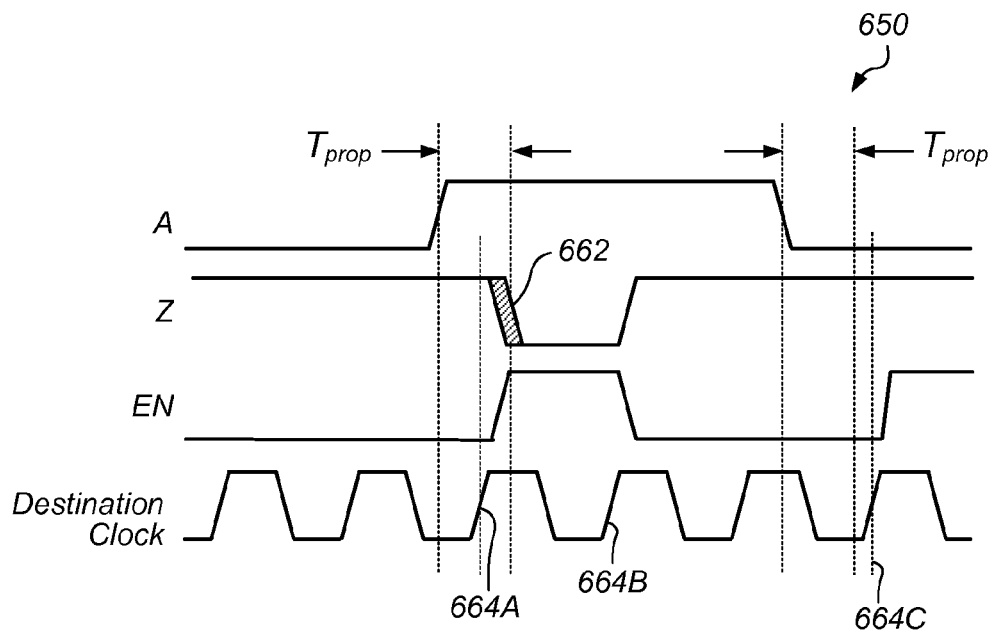
FIG. 6B is an exemplary timing diagram for the CDC buffer shown in FIG. 6A.

Turning now to FIG. 6B, an exemplary timing diagram 650 for one embodiment of CDC buffer 620 is depicted. In timing diagram 650, buffer 620 receives an input signal A that initially changes from low to high and subsequently changes back from high to low. When the initial change occurs, buffer 620 does not begin providing an error signal (shown as region 662) until the enable signal is asserted after rising edge 664A. If register 640 samples on rising edge 664A, register 640 samples the constant signal provided by buffer 620, instead of an error signal. After the period of $T_{prop}$, buffer 620 propagates the change in input signal A to output signal Z. If register 640 attempts to sample signal Z on rising clock edge 664B, register 640 will correctly sample the data signal. When input signal A subsequently changes again, the enable signal is asserted after rising edge 664C. Since the enable signal is asserted after $T_{prop}$, buffer 620 does not provide an error signal, and instead changes output signal Z to reflect the change in signal A. (Note that because signal A is the inverse of output signal Z when the enable signal is asserted, no change in output signal Z is shown. If signal A had changed to a logical one, output signal Z would reflect this change at this point.)

Figure 7A:
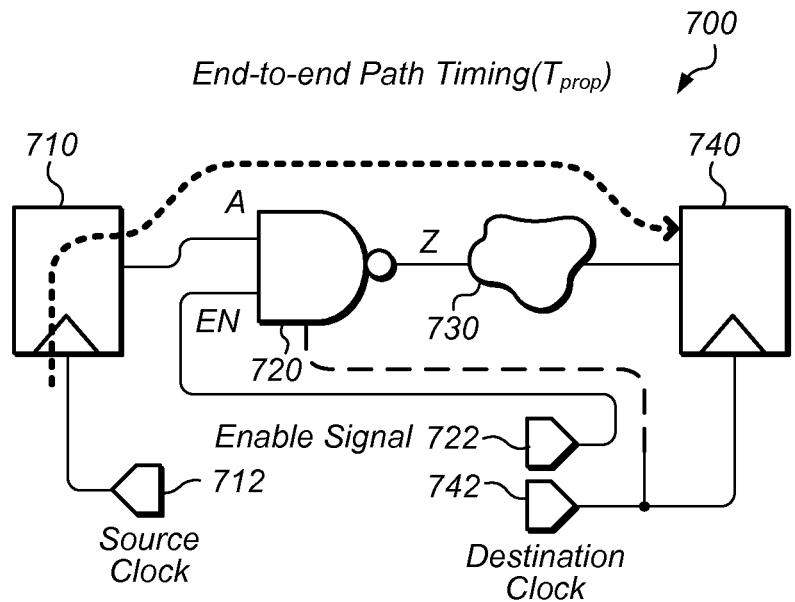
FIG. 7A is a block diagram illustrating one embodiment of a CDC buffer that creates a relative propagation delay and receives an enable signal.

Turning now to FIG. 7A, a block diagram 700 is depicted that includes CDC buffer 720. CDC buffer 720 is another embodiment of a CDC buffer that is configured to create a relative propagation delay (shown as $T_{prop}$) for a CDC path. In one embodiment, CDC buffer 720 is further configured to receive an enable signal, and to provide an error signal and then propagate a data signal over the path in response to the enable signal being asserted. In some instances, buffer 720 can minimize potential problems created by logical analysis tools. Like other buffers described above, buffer 720, in some embodiments, may be represented in an RTL model and/or netlist by inserting a marker (e.g., marker 330 or marker 350, respectively). In some embodiments, buffer 720 (in whole or in part) may be present in the physical design of an integrated circuit, and thus, present in the fabricated circuit. In one embodiment, $T_{prop}$ may be specified by one or more parameters in configuration file 300.

In diagram 700, a source register 710 is coupled to a destination register 740 via a CDC path that includes buffer 720 and logic 730. Registers 710 and 740 are driven by source clock 712 and destination clock 742, respectively. In the illustrated embodiment, buffer 720 is implemented as a NAND gate that is configured to logically gate input signal A with an enable signal 722. (In other embodiments, buffer 720 may be implemented differently—e.g., as a AND gate, or some other combination of logic.) In the illustrated embodiment, buffer 720 is further configured to receive a clock signal from destination clock 742, and to use the clock signal to determine when a time $T_{prop}$ has transpired. As described with buffer 620, if enable signal 722 is not asserted, buffer 720, in one embodiment, is configured to output a constant signal regardless of the value of input signal A. In one embodiment, once enable signal 722 is asserted, buffer 720 is configured to determine whether $T_{prop}$ has transpired based on a number of rising clock edges that have occurred since the change in signal A. In one embodiment, if $T_{prop}$ has not transpired, buffer 720 is configured to provide an error signal (as output signal Z) for the remaining period of $T_{prop}$. At which point, buffer 720 is configured to then propagate the change in input signal A to output signal Z. On the other hand, if $T_{prop}$ has transpired, buffer 720 is configured to propagate the change in input signal A to output signal Z without initially providing an error signal. In some embodiments, enable signal 722 is asserted after input signal A changes and a predetermined number of one or more rising edges of destination clock 742 have occurred.

In some embodiments, buffer 720 may be configured to create the effect of both absolute and relative propagation delays. In one embodiment, buffer 720 is configured to select the greater delay in determining when to provide an error signal and the data signal. Timing diagram 750 described next illustrates such usage of both delay types.

Figure 7B:
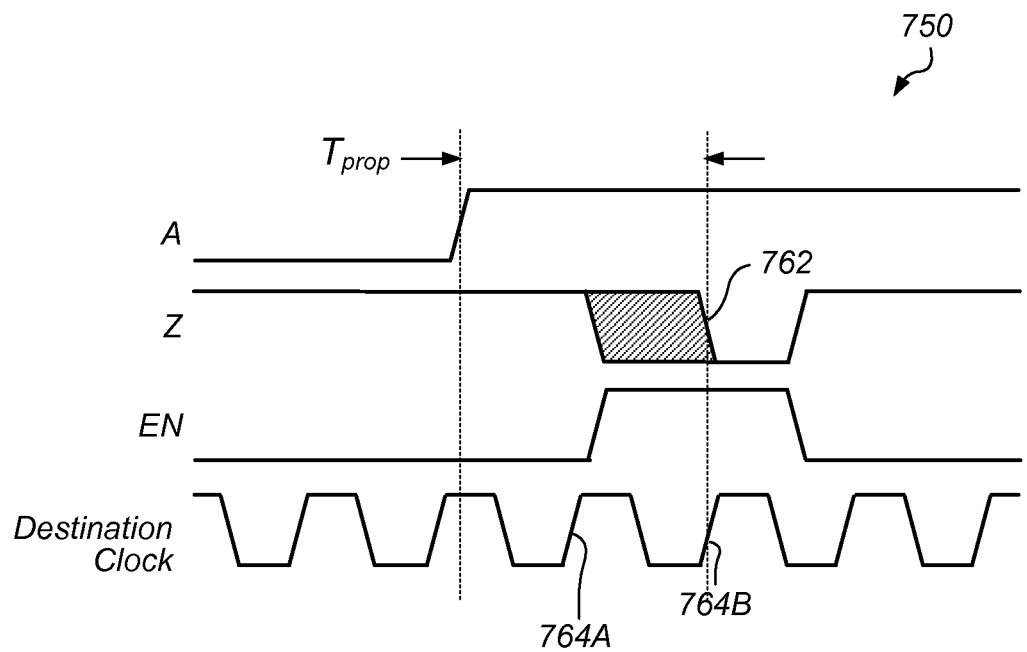
FIG. 7B is an exemplary timing diagram for the CDC buffer shown in FIG. 7A.

Turning now to FIG. 7B, an exemplary timing diagram 750 for one embodiment of CDC buffer 720 is depicted. In illustrated embodiment, buffer 720 is configured to provide an error signal for an absolute delay (labeled as $T_{prop}$) or a relative delay of one rising edge, whichever is greater. In timing diagram 750, buffer 720 receives an input signal A that changes from low to high. When the change occurs, buffer 720 does not begin providing an error signal (shown as region 762) until the enable signal is asserted after rising edge 764A. If register 740 samples on rising edge 764A, register 740 samples the constant signal provided by buffer 720. After the period of $T_{prop}$ and one rising edge of the destination clock, buffer 720 propagates the change in input signal A to output signal Z. If register 740 attempts to sample signal Z on rising clock edges 764B, register 740 may correctly sample the data signal. If, however, register 740 attempts to sample signal Z before this period, register 740 may sample the error signal.

Figure 8A:
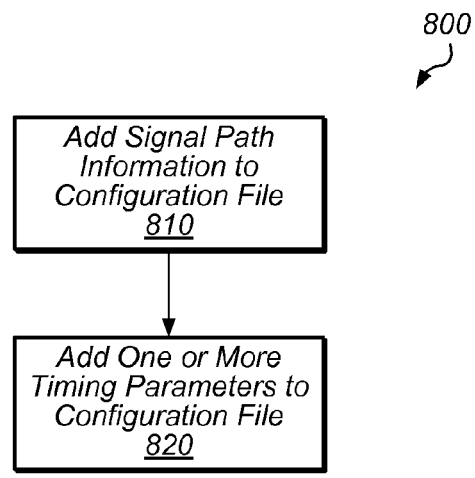
FIG. 8A is a flow diagram illustrating one embodiment of a method for creating a configuration file that is usable during different design stages of an integrated circuit.

Turning now to FIG. 8A, a flow diagram of method 800 is depicted. Method 800 is one embodiment of a method for creating a configuration file that is usable during different design stages (e.g., stages 210-240) of an integrated circuit (e.g., IC 10). In some embodiments, a simulation tool may use the configuration file (e.g., file 300) in conjunction with an RTL model (e.g., model 320) to detect timing problems created by CDC paths in an integrated circuit. In some embodiments, the configuration file may be generated from information in an RTL model (e.g., during design stage 210). In some embodiments, the configuration file may be used in conjunction with a netlist (e.g., netlist 340) to drive implementation of an integrated circuit. By being able to test for timing problems prior to fabrication and to drive implementation based on tested results, developers, in some instances, can more quickly implement robust integrated circuits. In some embodiments, steps 810 and 820 may be performed currently or in a different order than shown in FIG. 8A.

In step 810, signal path information (e.g., a name 312) is added to a configuration file, where the signal path information identifies a path (e.g., path 120) in an integrated circuit that has a source in a first clock domain (e.g., register 110) and a destination in a second clock domain (e.g., register 130). In one embodiment, the signal path information may include a name identifying the path. In one embodiment, the signal path information may include a location of the path. In various embodiments, the signal path information may include a name of a marker that is present in an RTL model, netlist, etc. In some embodiments, the marker represents a buffer (e.g., one of buffers 420-720) that is inserted into the path, where the buffer is configured to delay propagating the data signal from the source to the destination. In some embodiments, signal path information may identify the type of buffer that the marker represents.

In step 820, one or more timing parameters for the path are added to the configuration file, where the one or more timing parameters specify a propagation delay (e.g. delay 314) from the source to the destination. In one embodiment, the specified propagation delay is an absolute propagation delay (e.g., delay 314A) that specifies a fixed amount of time before a signal sent from the source is receivable by the destination. In one embodiment, the specified propagation delay is a relative propagation delay (e.g., delay 314B) that is an amount of time expressed as a function of clock cycles before a signal sent from the source is receivable by the destination. In some embodiments, the one or more timing parameters may specify both absolute and relative propagation delays. In some embodiments, the one or more timing parameters may be inferred based on names added during step 810.

In some embodiments, method 800 may be performed in conjunction with methods 830 and 860 described next.

Figure 8B:
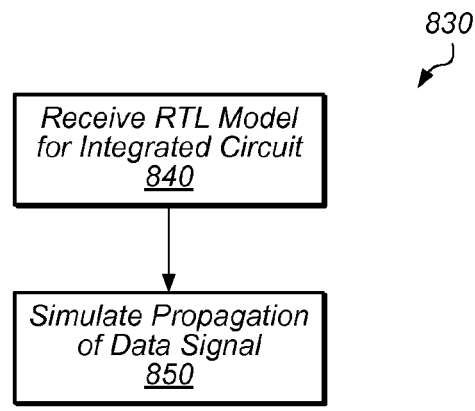
FIG. 8B is a flow diagram illustrating one embodiment of a method for performing a simulation using an RTL model.

Turning now to FIG. 8B, a flow diagram of a method 830 is depicted. Method 830 is one embodiment of a method for performing a simulation using an RTL model. In one embodiment, method 830 may be performed by a simulation tool to detect timing problems created by a CDC path. In various embodiments, the RTL file created in method 830 may be used in conjunction with the configuration file created in method 800. In some instances, performing method 830 can reduce implementation time and produce integrated circuits that are more robust.

In step 840, a register-transfer-level (RTL) model (e.g., model 320) for an integrated circuit (e.g., IC 10) is received, where the RTL model includes a marker (e.g., maker 330) associating a path in the integrated circuit with one or more timing parameters. In one embodiment, the one or more timing parameters specify a propagation delay (e.g., delay 314) for the path from a source in a first clock domain to a destination in a second clock domain. In one embodiment, the marker represents a buffer (e.g., one of buffers 420-720) that is inserted into the path, wherein the buffer is configured to delay propagating the data signal from the source to the destination for the specified propagation delay. In some embodiments, the specified propagation delay is an absolute propagation delay (e.g., delay 314A). In some embodiments, the specified propagation delay is a relative delay (e.g., delay 314B).

In step 850, the propagation of a data signal along the path is simulated based on the RTL model and the specified propagation delay. In one embodiment, the buffer is configured to provide an error signal (e.g., the signal X in Verilog) to the destination prior to propagating the data signal to the destination. In one embodiment, a simulation tool may determine whether a register at the destination has sampled the error signal prior to sampling the data signal. In one embodiment, if the register has sampled the error signal, the simulation tool may indicate that timing problems exist for the path. If the register does not sample the error signal, the simulation tool may indicate that no timing problems were detected.

Figure 8C:
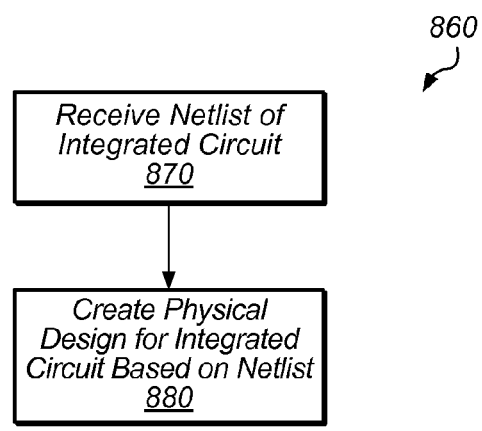
FIG. 8C is a flow diagram illustrating one embodiment of a method for creating a physical design using a netlist.

Turning now to FIG. 8C, a flow diagram of a method 860 is depicted. Method 860 is one embodiment of a method for creating a physical design using a netlist. In one embodiment, method 860 may be performed by design tools to produce graphic database system (GDS) II data for an integrated circuit. In some instances, performing method 860 can reduce implementation time and produce integrated circuits that are more robust.

In step 870, a netlist (e.g., netlist 340) for an integrated circuit (e.g., IC 10) is received, where the netlist includes a marker (e.g., maker 350) associating a path in the integrated circuit with one or more timing parameters. In one embodiment, the one or more timing parameters specify a propagation delay (e.g., delay 314) for the path from a source in a first clock domain to a destination in a second clock domain. In some embodiments, the specified propagation delay is an absolute propagation delay (e.g., delay 314A). In some embodiments, the specified propagation delay is a relative delay (e.g., delay 314B). In one embodiment, the marker represents a buffer (e.g., one of buffers 420-720) that is inserted into the path, where the buffer is configured to cause the path to propagate a data signal according to the specified propagation delay.

In step 880, a physical design for the integrated circuit is created based on the received netlist and the one or more timing parameters, where the physical design includes a representation of the path that has the specified propagation delay. In various embodiments, the physical design may be used to create one or more photomasks usable to fabricate the integrated circuit. In some embodiments, the buffer may be implemented in the physical design as a NAND gate that is configured to logically gate the path with a signal (e.g., one of enable signals 622 and 722) that specifies when the data signal is to be propagated.

Figure 9:
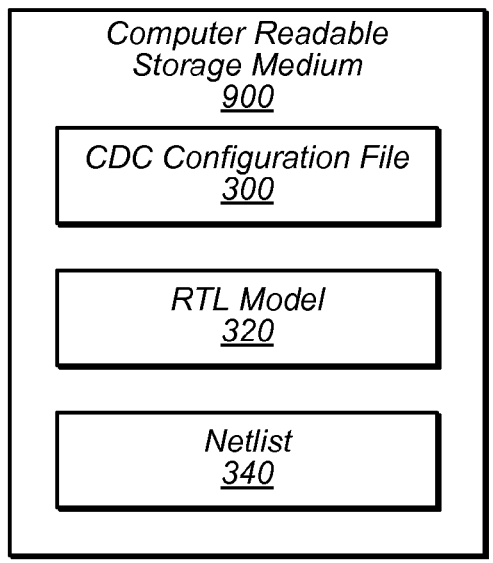
FIG. 9 is a block diagram illustrating one embodiment of a computer readable storage medium.

Turning now to FIG. 9, a block diagram of a computer readable storage medium 900 is depicted. In one embodiment, computer readable storage medium 900 can be used to store instructions read by a program and used, directly or indirectly, to fabricate hardware for an integrated circuit such as IC 10 described above. In the illustrated embodiment, computer readable storage medium 900 includes CDC configuration file 300, RTL model 320, and netlist 340. In some embodiments, storage medium 900 may include a single one of elements 300-340 or multiple ones of elements 300-340.

Computer readable storage medium 900 may be any non-transitory/tangible storage media readable by a computer to provide instructions and/or data to the computer. For example, a computer readable storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Exemplary Computer System

Figure 10:
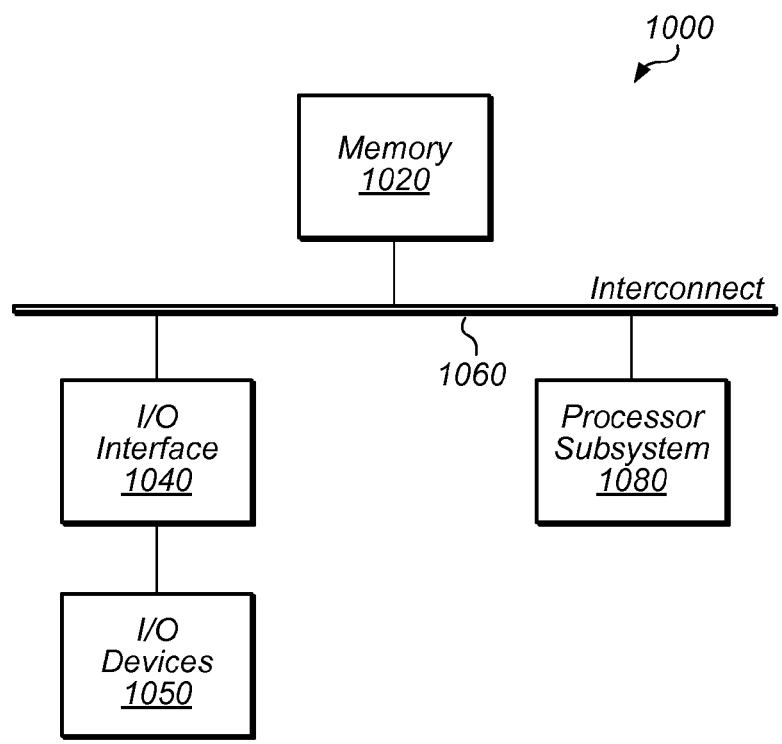
FIG. 10 is a block diagram illustrating one embodiment of an exemplary computer system.

Turning now to FIG. 10, one embodiment of an exemplary computer system 1000, which may include integrated circuit 10, is depicted. Computer system 1000 includes a processor subsystem 1080 that is coupled to a system memory 1020 and I/O interfaces(s) 1040 via an interconnect 1060 (e.g., a system bus). I/O interface(s) 1040 is coupled to one or more I/O devices 1050. Computer system 1000 may be any of various types of devices, including, but not limited to, a server system, personal computer system, desktop computer, laptop or notebook computer, mainframe computer system, handheld computer, workstation, network computer, a consumer device such as a mobile phone, pager, or personal data assistant (PDA). Computer system 1000 may also be any type of networked peripheral device such as storage devices, switches, modems, routers, etc. Although a single computer system 1000 is shown for convenience, system 1000 may also be implemented as two or more computer systems operating together.

Processor subsystem 1080 may include one or more processors or processing units. For example, processor subsystem 1080 may include one or more processing units (each of which may have multiple processing elements or cores) that are coupled to one or more resource control processing elements 1020. In various embodiments of computer system 1000, multiple instances of processor subsystem 1080 may be coupled to interconnect 1060. In various embodiments, processor subsystem 1080 (or each processor unit or processing element within 1080) may contain a cache or other form of on-board memory. In one embodiment, processor subsystem 1080 may include processor 10 described above.

System memory 1020 is usable by processor subsystem 1080. System memory 1020 may be implemented using different physical memory media, such as hard disk storage, floppy disk storage, removable disk storage, flash memory, random access memory (RAM—static RAM (SRAM), extended data out (EDO) RAM, synchronous dynamic RAM (SDRAM), double data rate (DDR) SDRAM, RAMBUS RAM, etc.), read only memory (ROM—programmable ROM (PROM), electrically erasable programmable ROM (EEPROM), etc.), and so on. Memory in computer system 1000 is not limited to primary storage such as memory 1020. Rather, computer system 1000 may also include other forms of storage such as cache memory in processor subsystem 1080 and secondary storage on I/O Devices 1050 (e.g., a hard drive, storage array, etc.). In some embodiments, these other forms of storage may also store program instructions executable by processor subsystem 1080.

I/O interfaces 1040 may be any of various types of interfaces configured to couple to and communicate with other devices, according to various embodiments. In one embodiment, I/O interface 1040 is a bridge chip (e.g., Southbridge) from a front-side to one or more back-side buses. I/O interfaces 1040 may be coupled to one or more I/O devices 1050 via one or more corresponding buses or other interfaces. Examples of I/O devices include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1000 is coupled to a network via a network interface device.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An integrated circuit, comprising:
    a path between a source register in a first clock domain and a destination register in a second clock domain;
    a buffer within the path, wherein the buffer is configured to propagate a buffer input data signal along the path responsive to a buffer enable signal being asserted; and
    circuitry configured to:
        determine that a predetermined number of clock cycles have occurred since the buffer received the buffer input data signal; and
        assert the buffer enable signal in response to determining that the predetermined number of clock cycles of have occurred.

2. The integrated circuit of claim 1, wherein the predetermined number of clock cycles is a predetermined number of clock cycles of a clock in the second clock domain.

3. The integrated circuit of claim 1, wherein the circuitry is configured to supply the buffer enable signal from the second clock domain.

4. The integrated circuit of claim 1, wherein the buffer includes a NAND gate configured to receive the buffer input data signal and the buffer enable signal.

5. The integrated circuit of claim 1, wherein the buffer includes an AND gate configured to receive the buffer input data signal and the buffer enable signal.

6. The integrated circuit of claim 1, further comprising the source register and the destination register.

7. A method of design, comprising:
    receiving, at a computer system, a register transfer level (RTL) model for an integrated circuit, wherein the RTL model associates a buffer in a path of the integrated circuit with one or more timing parameters, wherein the one or more timing parameters specify a propagation delay for the path from an input to an output, wherein the RTL model specifies that the buffer is to provide an error signal to the output for a portion of the specified propagation delay and, after the specified propagation delay, to propagate a data signal from the input to the output; and
    creating a physical design for the integrated circuit based on the RTL model and the one or more timing parameters, wherein the physical design includes a representation of the path that has the specified propagation delay.

8. The method of claim 7, wherein the input is in a first clock domain, and wherein the output is in a second clock domain.

9. The method of claim 7, wherein the RTL model specifies that the buffer is to initiate providing the error signal to the output in response to receiving an enable signal.

10. The method of claim 7, wherein creating the physical design includes:
    creating a netlist of the integrated circuit based on the RTL model; and
    creating the physical design for the integrated circuit based on the created netlist.

11. The method of claim 10, wherein the netlist specifies that the buffer includes an AND gate configured to receive a data signal and an enable signal.

12. The method of claim 7, further comprising:
    simulating, via a simulation tool, operation of the integrated circuit based on the RTL model, wherein the simulating includes the buffer providing the error signal to the output for the portion of the specified propagation delay and, after the specified propagation delay, propagating the data signal from the input to the output.

13. The method of claim 7, wherein the physical design is created using a graphic database system (GDSII).

14. A method of design, comprising:
    adding signal path information to a configuration file in a computer system, wherein the signal path information identifies a path in an integrated circuit that has a source in a first clock domain and a destination, wherein the signal path information further specifies that the path is to include a buffer; and
    adding one or more timing parameters for the path to the configuration file, wherein the one or more timing parameters specify a propagation delay from the source to the destination;
    wherein, upon the configuration file being accessed by a simulation tool, the configuration file enables the simulation tool to simulate operations of the integrated circuit, wherein the simulated operations include:
        the buffer receiving a data signal from the source;
        the buffer providing the data signal to the destination after the propagation delay has transpired; and
        the buffer providing an error signal to the destination prior to providing the data signal to the destination.

15. The method of claim 14, wherein the destination is in a second clock domain distinct from the first clock domain.

16. The method of claim 14, wherein the simulation tool is executable to detect an error in response to the destination attempting to capture the error signal.

17. The method of claim 14, wherein the simulated operations further include the buffer initiating providing the error signal to the destination in response to receiving an enable signal.

18. The method of claim 14, wherein the propagation delay is expressed as a function of clock cycles.

19. The method of claim 14, further comprising:
    inserting the buffer into a register-transfer-level (RTL) model of the integrated circuit; and
    providing the RTL model and the configuration file to the simulation tool, wherein the simulation tool is executable to access the RTL model and specified propagation delay to perform a logical simulation of the path.

20. The method of claim 19, wherein the RTL model is created with a hardware description language, and wherein the error signal is an unknown signal X in the hardware description language.

* * * * *